US012695670B2

(12) United States Patent
Cabamalan et al.

(10) Patent No.: US 12,695,670 B2
(45) Date of Patent: Jul. 28, 2026

(54) METHODS AND SYSTEMS TO DETERMINE AND MONITOR TOPOLOGIES OF 5G SERVICE-BASED ARCHITECTURES

(71) Applicant: T-Mobile USA, Inc., Bellevue, WA (US)

(72) Inventors: Maria Victoria Cabamalan, Covington, WA (US); John Paul Cruz, Renton, WA (US); Emily Fanjia Kong, Bellevue, WA (US); Joseph Santor, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 370 days.

(21) Appl. No.: 18/353,812

(22) Filed: Jul. 17, 2023

(65) Prior Publication Data

US 2025/0030605 A1     Jan. 23, 2025

(51) Int. Cl.
| | |
|---|---|
| *H04L 41/12* | (2022.01) |
| *H04L 41/142* | (2022.01) |
| *H04L 43/04* | (2022.01) |
| *H04L 43/20* | (2022.01) |

(52) U.S. Cl.
CPC ............ *H04L 41/12* (2013.01); *H04L 41/142* (2013.01); *H04L 43/04* (2013.01); *H04L 43/20* (2022.05)

(58) Field of Classification Search
CPC ....... H04L 41/12; H04L 43/20; H04L 41/142; H04L 43/04
USPC ........................................................ 370/242
See application file for complete search history.

(56) References Cited

U.S. PATENT DOCUMENTS

| | | | |
|---|---|---|---|
| 9,582,306 B2 | 2/2017 | Dowlatkhah et al. | |
| 10,581,984 B2 | 3/2020 | Livanos et al. | |
| 10,609,530 B1 | 3/2020 | Patil et al. | |
| 10,833,938 B1 * | 11/2020 | Rajput | H04L 67/30 |
| 11,026,074 B2 | 6/2021 | Patil et al. | |
| 11,119,807 B2 | 9/2021 | Engelhart | |
| 11,140,231 B2 | 10/2021 | Cakulev et al. | |
| 11,265,694 B2 | 3/2022 | Farooq | |
| 11,388,039 B1 * | 7/2022 | Taher | H04L 41/069 |
| 11,405,861 B2 | 8/2022 | Regnault et al. | |
| 11,463,863 B2 | 10/2022 | Qiao et al. | |
| 11,483,694 B2 | 10/2022 | Krishan | |
| 11,743,363 B1 * | 8/2023 | Goel | H04L 67/51 |
| | | | 709/201 |

(Continued)

FOREIGN PATENT DOCUMENTS

| | | |
|---|---|---|
| CN | 111095970 A | 5/2020 |
| CN | 111107130 A | 5/2020 |

(Continued)

*Primary Examiner* — Christopher B Robinson
*Assistant Examiner* — Chong G Kim
(74) *Attorney, Agent, or Firm* — Perkins Coie LLP

(57) ABSTRACT

A system polls a collection of distributed Network Repository Functions (NRFs) of a telecommunications network for status data of a collection of Network Functions (NFs). The system receives status data of a current time slice from a time-series collection of states of the collection of NFs. The system generates an end-to-end network topology for the telecommunications network based on an aggregation of the status data and can detect an anomalous service area based on the end-to-end network topology.

20 Claims, 5 Drawing Sheets

(56) References Cited

U.S. PATENT DOCUMENTS

| | | | | |
|---|---|---|---|---|
| 2007/0198679 A1* | 8/2007 | Duyanovich | ....... G06F 11/3409 |
| | | | 709/223 |
| 2019/0068467 A1* | 2/2019 | Chauhan | ............ G06F 11/3452 |
| 2020/0296606 A1* | 9/2020 | Mendoza | ................ H04L 41/12 |
| 2021/0014102 A1* | 1/2021 | Singh | .................... H04L 41/142 |
| 2021/0064406 A1* | 3/2021 | Engelhart | .......... H04L 65/1073 |
| 2021/0176650 A1* | 6/2021 | Wang | ..................... H04W 8/14 |
| 2021/0258861 A1* | 8/2021 | Wang | .................... H04W 48/10 |
| 2021/0373931 A1 | 12/2021 | Engelhart | |
| 2022/0174471 A1 | 6/2022 | Farooq | |
| 2022/0345913 A1 | 10/2022 | Al-Dulaimi et al. | |
| 2023/0007536 A1* | 1/2023 | Sharma | ............... H04W 28/088 |
| 2023/0042219 A1* | 2/2023 | Singh | .................... H04W 48/16 |
| 2023/0042948 A1 | 2/2023 | Qiao et al. | |
| 2023/0090068 A1 | 3/2023 | Rajput et al. | |
| 2023/0284292 A1* | 9/2023 | Hellgren | ............. H04L 41/0803 |
| | | | 370/329 |
| 2023/0292274 A1* | 9/2023 | Jayaramachar | ......... H04L 41/40 |
| 2024/0205862 A1* | 6/2024 | Goel | ........................ H04L 67/51 |
| 2024/0389002 A1* | 11/2024 | Shekhar | ................ H04W 48/16 |

FOREIGN PATENT DOCUMENTS

| | | | |
|---|---|---|---|
| CN | 111201765 A | 5/2020 |
| CN | 110730487 B | 12/2020 |
| CN | 112567685 A | 3/2021 |
| CN | 112586060 A | 3/2021 |
| CN | 112602342 A | 4/2021 |
| CN | 112997513 A | 6/2021 |
| CN | 111386677 B | 2/2022 |
| CN | 110999346 B | 3/2022 |
| CN | 111052711 B | 8/2022 |
| CN | 109792598 B | 1/2023 |
| CN | 111034238 B | 6/2023 |
| DE | 102006001998 B4 | 8/2020 |
| DE | 102017106316 B4 | 3/2021 |
| DE | 102020206861 A1 | 12/2021 |
| EP | 1865448 A1 | 12/2007 |
| EP | 2036248 A1 | 3/2009 |
| EP | 3509336 A1 | 7/2019 |
| EP | 3523923 A1 | 8/2019 |
| EP | 3701735 A1 | 9/2020 |
| EP | 3729783 A1 | 10/2020 |
| EP | 3777448 A1 | 2/2021 |
| EP | 3782351 A1 | 2/2021 |
| EP | 3855705 A1 | 7/2021 |
| EP | 3886482 A1 | 9/2021 |
| EP | 3937460 A2 | 1/2022 |
| EP | 3937521 A1 | 1/2022 |
| EP | 3644552 B1 | 7/2022 |
| EP | 3603208 B1 | 8/2022 |
| EP | 3679707 B1 | 12/2022 |
| EP | 3669275 B1 | 3/2023 |
| EP | 3603238 B1 | 7/2023 |
| JP | 5950943 B2 | 6/2016 |
| JP | 6416895 B2 | 10/2018 |
| JP | 2020530703 A | 10/2020 |
| JP | 6900481 B2 | 6/2021 |
| JP | 6979520 B2 | 11/2021 |
| JP | 6992050 B2 | 12/2021 |
| JP | 7197574 B2 | 12/2022 |
| JP | 7277062 B2 | 5/2023 |
| KR | 20070084617 A | 8/2007 |
| KR | 20080020469 A | 3/2008 |
| KR | 100928913 B1 | 11/2009 |
| KR | 101470991 B1 | 12/2014 |
| KR | 20170119296 A | 10/2017 |
| KR | 20180022565 A | 3/2018 |
| KR | 20190088060 A | 7/2019 |
| KR | 20190088878 A | 7/2019 |
| KR | 102094361 B1 | 4/2020 |
| KR | 20200077829 A | 7/2020 |
| KR | 20200116845 A | 10/2020 |
| KR | 20210055561 A | 5/2021 |
| KR | 20210069105 A | 6/2021 |
| KR | 20210108785 A | 9/2021 |
| KR | 102325258 B1 | 11/2021 |
| KR | 102327021 B1 | 11/2021 |
| KR | 20220092414 A | 7/2022 |
| KR | 102437811 B1 | 8/2022 |
| KR | 102470370 B1 | 11/2022 |
| KR | 102522316 B1 | 4/2023 |
| KR | 102544113 B1 | 6/2023 |
| WO | 2007141378 A1 | 12/2007 |
| WO | 2012106710 A1 | 8/2012 |
| WO | 2012119147 A1 | 9/2012 |
| WO | 2014202708 A1 | 12/2014 |
| WO | 2018067780 A1 | 4/2018 |
| WO | 2018172182 A1 | 9/2018 |
| WO | 2018175498 A1 | 9/2018 |
| WO | 2019034609 A1 | 2/2019 |
| WO | 2019034610 A1 | 2/2019 |
| WO | 2019193129 A1 | 10/2019 |
| WO | 2020074126 A1 | 4/2020 |
| WO | 2020141356 A1 | 7/2020 |
| WO | 2020146327 A1 | 7/2020 |
| WO | 2020156685 A1 | 8/2020 |
| WO | 2020164749 A1 | 8/2020 |
| WO | 2020169174 A1 | 8/2020 |
| WO | 2020205145 A1 | 10/2020 |
| WO | 2020256688 A1 | 12/2020 |
| WO | 2021008716 A1 | 1/2021 |
| WO | 2021018460 A1 | 2/2021 |
| WO | 2021028435 A1 | 2/2021 |
| WO | 2021140272 A1 | 7/2021 |
| WO | 2021162964 A1 | 8/2021 |
| WO | 2021172810 A1 | 9/2021 |
| WO | 2021187948 A1 | 9/2021 |
| WO | 2021188023 A1 | 9/2021 |
| WO | 2021194471 A1 | 9/2021 |
| WO | 2021224544 A1 | 11/2021 |
| WO | 2021224545 A1 | 11/2021 |
| WO | 2021234639 A1 | 11/2021 |
| WO | 2021240055 A1 | 12/2021 |
| WO | 2022152484 A1 | 7/2022 |
| WO | 2023052596 A1 | 4/2023 |

* cited by examiner

400

Start

402

Poll a collection of Network Repository Functions (NRFs) belonging to a telecommunications network

404

Receive status data belonging to the collection of Network Functions (NFs)

406

Generate an end-to-end network topology for the telecommunications network

408

Detect an anomalous service area

No

Yes

410

Issue alert
Record timestamp
Flag anomaly

End

500

METHODS AND SYSTEMS TO DETERMINE AND MONITOR TOPOLOGIES OF 5G SERVICE-BASED ARCHITECTURES

BACKGROUND

Service-Based Architectures provide a modular framework from which common applications can be deployed using components of varying sources and suppliers. The 3GPP standards define a Service-Based Architecture (SBA), whereby the control plane functionality and common data repositories of a 5G network are delivered by way of a set of interconnected Network Functions (NFs), each with authorization to access each other's services. Assuming the role of either service consumer or service producer, NFs are self-contained, independent, and reusable. Each NF service exposes its functionality through a Service-Based Interface (SBI), which employs a well-defined REST interface using HTTP/2.

With NFs built using microservice methodologies, the 5G SBA will ultimately evolve into a complete service mesh with service discovery, load balancing, encryption, authentication, and authorization, employing a sidecar for inter-service communication. Currently, the SBA employs a centralized discovery framework that leverages an NF Repository Function (NRF). The NRF maintains a record of available NF instances and their supported services. It allows other NF instances to subscribe and be notified of registrations from NF instances of a given type. The NRF supports service discovery by receipt of discovery requests from NF instances and details which NF instances support specific services.

BRIEF DESCRIPTION OF THE DRAWINGS

Detailed descriptions of implementations of the present invention will be described and explained through the use of the accompanying drawings.

Figure 1:
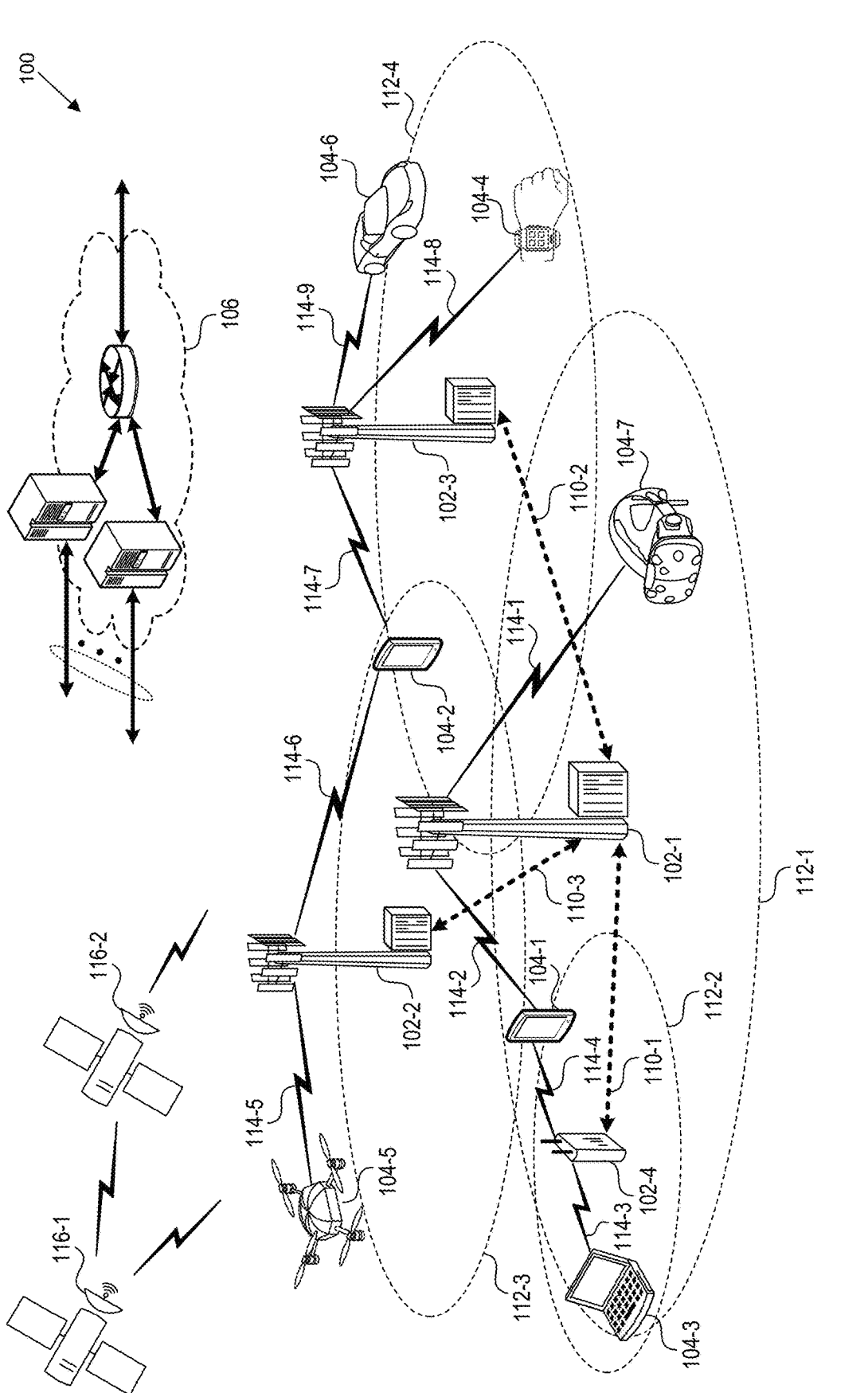
FIG. 1 is a block diagram that illustrates a wireless communications system that can implement aspects of the present technology.

The technologies described herein will become more apparent to those skilled in the art by studying the Detailed Description in conjunction with the drawings. Embodiments, or implementations, describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to monitoring Network Function (NF) profiles of Network Repository Functions (NRF) and determining a network topology to resolve anomalous service areas. A telecommunications system includes a collection of NRFs, each of which implements registration and discovery of a collection of NFs. An NF from the collection of NFs includes a profile comprising fields. The fields of these profiles are defined according to states, which are recorded to the respective NRF for that NF as time-series data. The system can create a centralized view of all the NFs in the network and their profiles by pulling from individual NRF databases periodically and consolidating these databases from different NRFs into a single database. From this information, an end-to-end network topology can be determined.

For example, by looking at the consolidated NRF database, the technology can derive which Session Management Function (SMF) instance will be discovered by an Access Mobility Function (AMF) based on a Tracking Area Identity Range (TaiRange) and a Data Network Name (DNN) registered by the SMF. Additionally, based on this centralized NRF database registration information, alarms, reports, and historical logs can be generated for one or more NFs and events. For example, an alarm can be generated when an NF goes into a "Suspended" state, including the timestamp when the event happened.

The disclosed technology addresses various problems. For example, in a 5G Standalone Network where there is more than one NRF, it is an operational challenge to determine in which NRF an NF is registered. It is also a challenge to know the status of each NF. The methods and systems disclosed herein allow operators to troubleshoot the 5G SBA and avoid issues that can impact customers.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNB" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multipath environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits-per-second data transmission in the 6G and beyond era, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
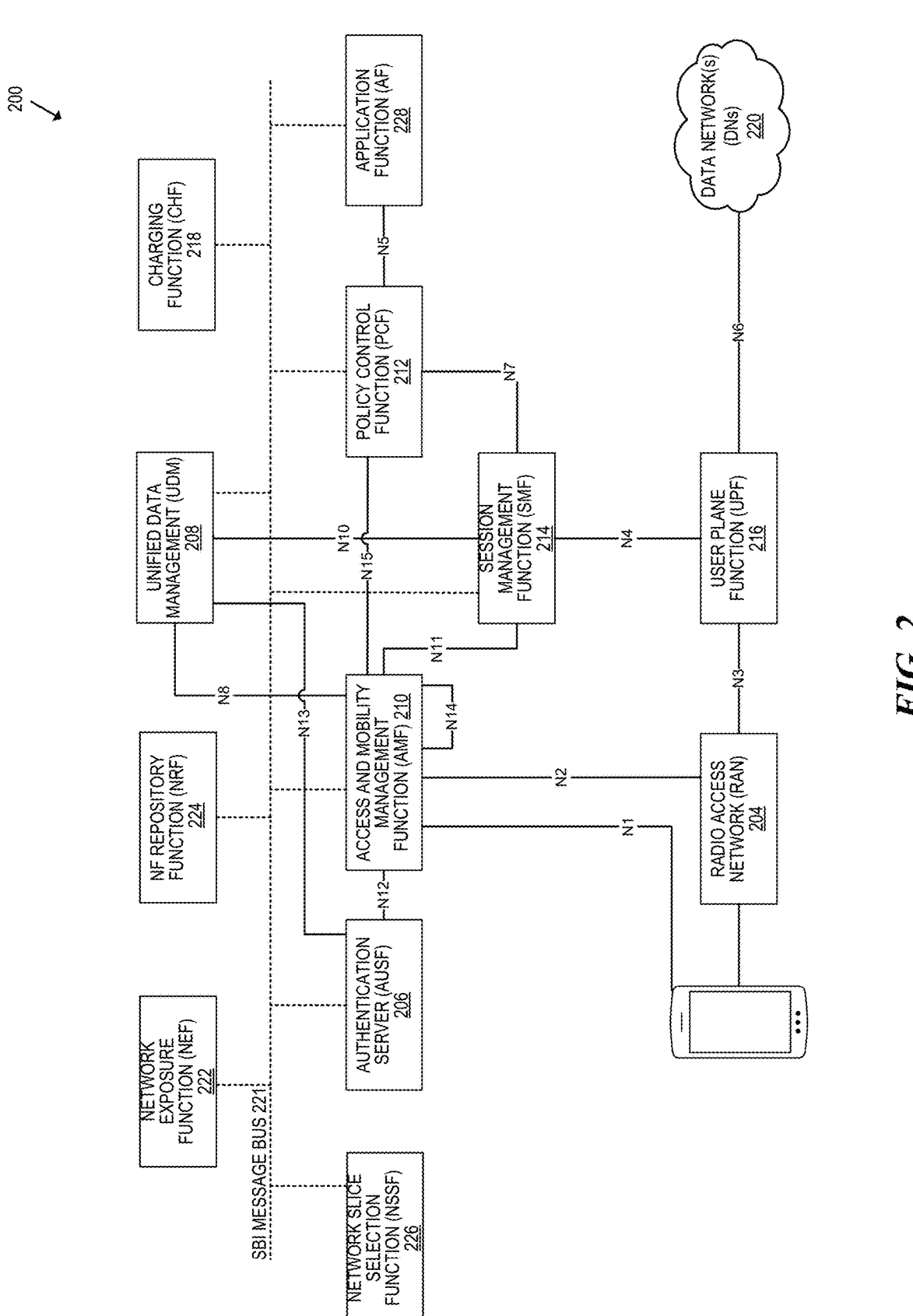
FIG. 2 is a block diagram that illustrates 5G core Network Functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility Management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service-Based Architecture (SBA) through a Service-Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentica-tion, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes Network Slice selection, which is regulated by the NSSF 226.

Determine and Monitor a Topology of a 5G Service-Based Architecture

Figure 3:
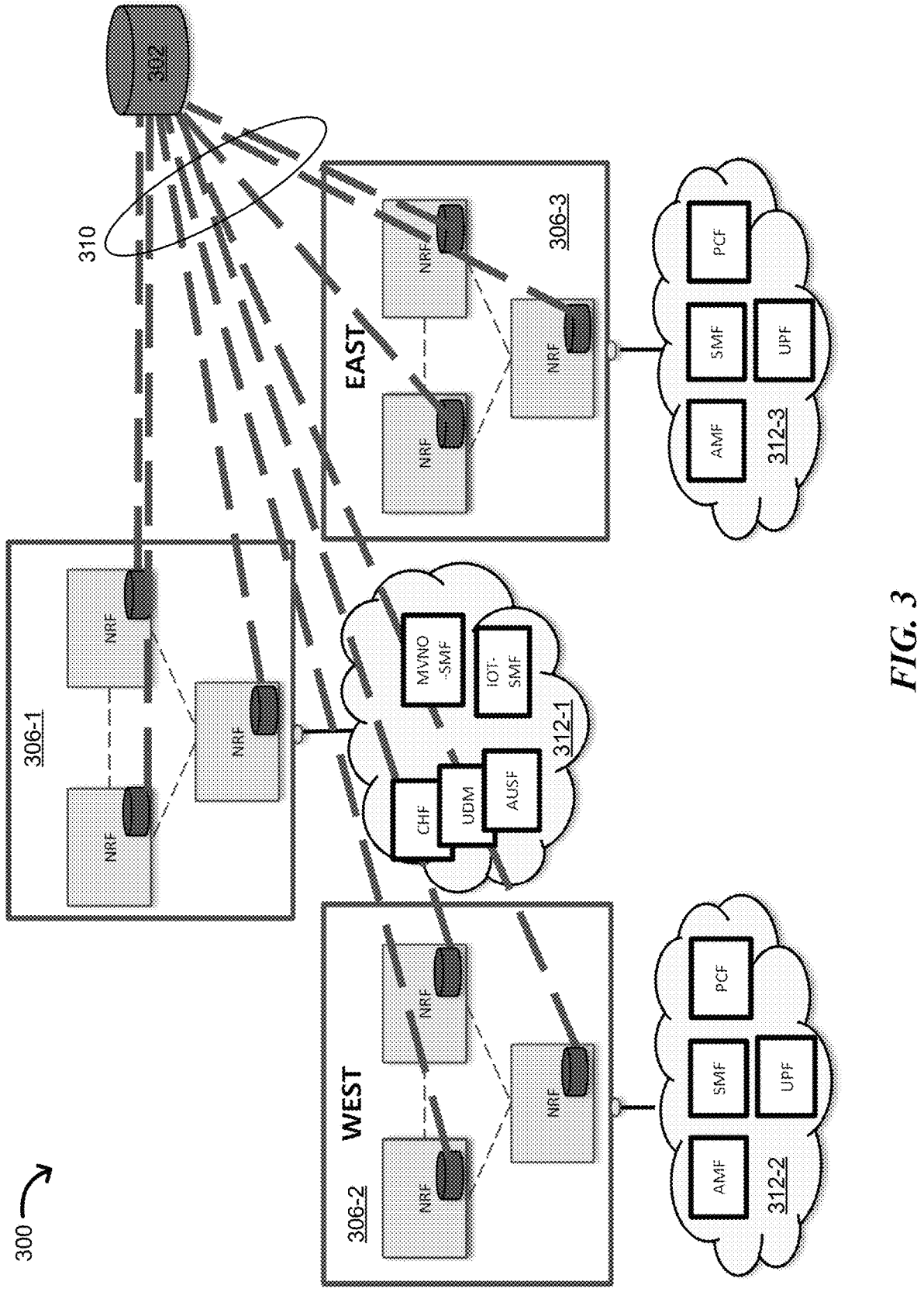
FIG. 3 is a block diagram that illustrates a system configured to determine and monitor a topology of 5G Service-Based Architecture (SBA).

FIG. 3 is a block diagram that illustrates an example of a system 300 including a 5G Service-Based Architecture for a telecommunications network, in which at least some operations described herein can be implemented. As shown, the system 300 includes a central hub 302 and a collection of distributed Network Repository Functions (NRFs). The NRFs can be grouped into regions 306-1, 306-2, and 306-3, as illustrated. Furthermore, these regions 306-1, 306-2, and 306-3 can correspond to a geographical area (e.g., West, East, or National). Either collectively or individually, the NRFs can be referred to herein by the label "306." The NRFs 306 can include their own architectures with applications and file systems, running on physical servers, on the cloud, or a combination of both. The NRFs 306 can be self-contained and disconnected from one another, i.e., running on separate networks. Each NRF 306 can correspond to an area of service for a group of customers to a telecommunications network.

Included within each NRF 306 is a collection of Network Functions (NFs) that are available to customers for that corresponding area of service, e.g., arranged into group 312-1, group 312-2, and group 312-3, as illustrated. The NFs can be referred to herein by the label "312," either collectively or individually. NFs 312 can be applications or services. These can include an Access and Mobility Management Function (AMF), a Session Management Function (SMF), a User Plane Function (UPF), a Policy Control Function (PCF), an Authentication Server Function (AUSF), a Unified Data Management (UDM), an Application Function (AF), a Network Exposure Function (NEF), and/or a Network Slice Selection Function (NSSF). An NF can be included in multiple different NRFs, e.g., as a UPF offered to groups of customers in separate areas of service.

Every NF 312 has a profile saved to an NRF repository. The NRF repository can be accessed via a physical server, a cluster of servers, via the cloud, or as a distributed network across a variety of physical and virtual platforms. NF profiles include a collection of fields that each can include a time-series collection of states. These fields can include a fully qualified domain, an IP address, a network function status, network slice selection assistance information, a data network name, locality, priority, and a Tracking Area Identity Range List. The states can be values that are representative of discrete moments in time. These states can be of an enumerated type (e.g., UNDISCOVERABLE, SUSPENDED, REGISTERED, or missing), integers, floats, strings, Booleans, defined according to a custom data class, or a combination of the foregoing data types. These fields can be saved according to relational database tables, key-value documents, hash tables, or some other data structure. Each NF 312 can include an API by which it can be queried.

Queries can be sent to each one of the distributed NRFs 306 by one or more connections 310 (e.g., a secure shell connection, a Transmission Control Protocol connection, a Remote Desktop Protocol connection, or a user datagram protocol). Each NRF 306 is accessible to the central hub 302 by the connection(s) 310. The connection(s) 310 can be configured to allow for queries and commands to be sent and executed remotely on the NRF 306, as well as for output to be collected from the NRF and sent back to the central hub 302. This output can include partial status data based on a current time slice from the time-series collection of states, for at least a subset of the fields included in the NF profiles, for at least a subset of the distributed NRFs 306. Such output can be parsed, scraped, or otherwise preprocessed, either locally on the NRF 306, where it is generated, or remotely at the central hub 302. The central hub 302 can include a data repository (e.g., a relational database, a data lake, or a NoSQL document database) where the output can be saved and aggregated to form a view of an end-to-end network topology for the telecommunications network. The central hub can also include analytics functionality, which can trigger queries to be sent over the connection(s) 310 to the pertinent NRFs 306. In such example embodiments, the analytics functionality can include a time function, a clustering algorithm, a neural network, or a statistical distribution based on historical data present in the data repository.

Figure 4:
FIG. 4 is a block diagram that illustrates a method to determine and monitor a topology of 5G SBA.
Figure 4:
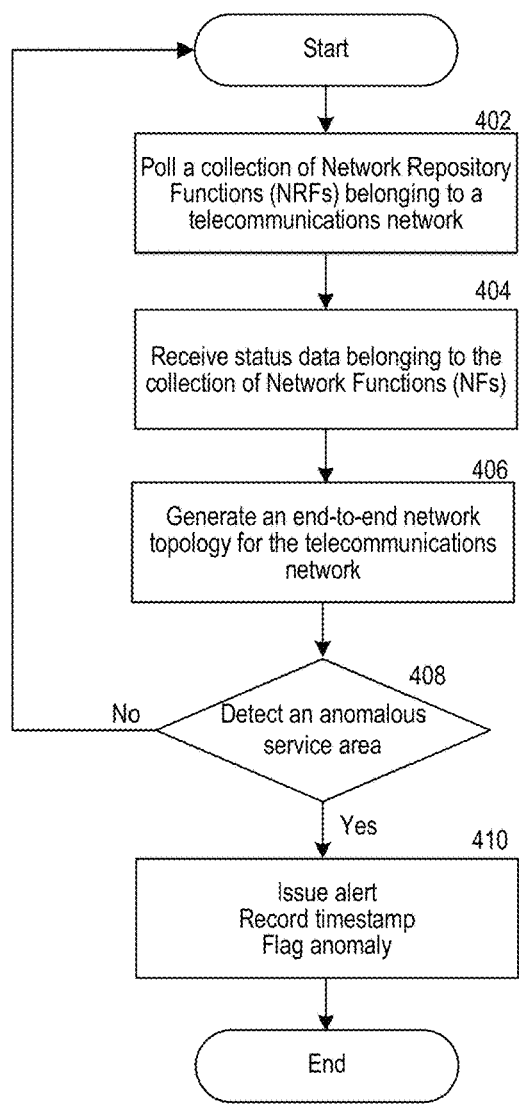

FIG. 4 is a block diagram that illustrates a method 400 to determine and monitor a topology of 5G SBA. The method 400 can be performed by a system of a telecommunications network, which is configured to determine and monitor a topology of its 5G SBA. In one example, the system includes at least one hardware processor and at least one non-transitory memory storing instructions, which, when executed by the at least one hardware processor, cause the system to perform the method 400.

At 402, the system can poll a collection of distributed Network Repository Functions (NRFs) of a telecommunications network for status data belonging to Network Functions (NFs). In some embodiments, the collection of NRFs can be divided into regions, in which case each region corresponds to a geographical area. Each NRF in the distributed NRFs includes a collection of NFs. In one example, authorization is required for the system to poll the distributed NRFs and/or access the NFs that belong to an NRF. Additionally, each NRF can monitor a service provided by a collection of associated NFs. In the embodiments, the NFs are associated in that they are providing related or common service(s) to users of the telecommunications network (e.g., Session Management Function (SMF), Access and Mobility Management Function (AMF), or User Plane Function (UPF)). Additionally, each NRF can store a profile for each NF. The profiles can include a collection of fields, that store data related to time-series collections of states.

In one example, the system can query the collection of NFs for each NRF, where each NRF includes a list of devices. Further, each query can include a list of commands to be run in a sequence on a respective device from the list of devices. Also, each query can include an authorization that is specific to the respective device where the list of commands is run. In another example, the system can poll the collection of distributed NRFs in response to an operation. The operation can respond to a time function, a clustering algorithm, a neural network, a statistical distribution based on historical data or real-time data, or one or more of the foregoing models, distributions, and functions.

In another example, the system polls the collection of distributed NRFs by causing the NRFs to perform operations. In such an embodiment, the operations are performed in response to a query sent to the NRFs from the system. The operations can include providing authorization to the device(s) (e.g., a password or a key), connecting to the device, and running a series of commands on the device(s) in a proper sequence. From here, the system can collect standard output from the device(s). Alternatively, the system can also query an NF API for additional information, mapping the additional information into the standard output. The system can parse the standard output for relevant information (i.e., relevancy determined from the mapping) and sort the relevant information into a readable format. The system can retrieve status data from the relevant information in its readable format on the device(s). This status data can be either a partial or complete view of the NFs.

At 404, the system receives particular status data obtained from the fields belonging to the collection of NFs, accessible via the distributed NRFs. These fields can represent either partial status data of the NFs or a complete profile view. In some embodiments, the particular status data is of a current time slice from the time-series collection of states. In one example, the particular status data includes a combination of values. For example, these values can include a fully qualified domain name (fqdn), an IP address, a network function status (nfstatus), network slice selection assistance information (nssai), a data network name (dnn), a locality, a priority, or a Tracking Area Identity Range List (taiRangeList), either separately, all together, or in varying combinations.

At 406, the system generates an end-to-end network topology for the telecommunications network. The topology is based on an aggregation of the status data. In some examples, the end-to-end network topology can delineate the current and historical states of both services and connections belonging to the telecommunications network. The end-to-end network topology can reflect either a portion of the telecommunications network or its entirety.

At 408, the system detects an anomaly related to a service area based on a particular instance of the end-to-end network topology. If the system does not detect an anomalous service at 408, the system can restart the method 400 and poll the collection of NRFs again. In another example, at 410, the system performs an action in response to the detected anomaly (e.g., anomalous service area). The action can include issuing an alert, recording a timestamp to memorialize the detected anomaly, or flagging an anomalous state, an anomalous field, an NF, or an anomalous NRF. The anomalies that are flagged can come from within a particular service area of the telecommunications network.

In another example, detecting an anomalous service area causes the system to compare a current state to a past state for a field in an NF. In such an embodiment, the past state belongs to a past time slice, and the current state to a current time slice, from the same time-series collection for a single field. Additionally, the current state can include an undiscoverable state, a suspended state, or a missing state, while the past state can include a registered state or a suspended state.

Computer System

Figure 5:
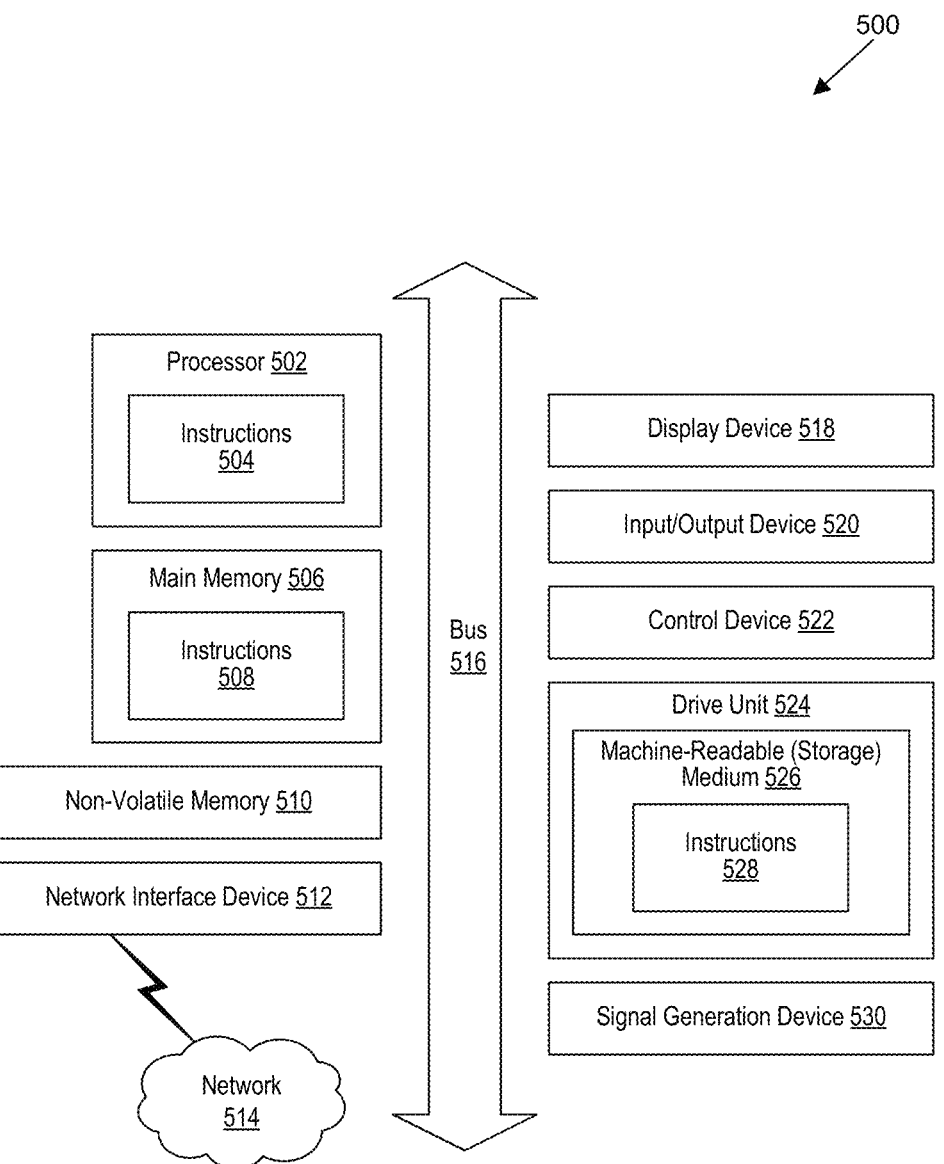
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, a video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementations, the computer system 500 can be an embedded computer system, a system-on-chip (SOC), a single-board computer system (SBC), or a distributed system such as a mesh of computer systems, or it can include one or more cloud components in one or more networks. Where appropriate, one or more computer systems 500 can perform operations in real time, near real time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in a computing device or devices. When read and executed by the processor 502, the instruction(s) cause the computing system 500 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense, that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A system of a telecommunications network configured to determine and monitor a topology of its 5G Service-Based Architecture, the system comprising:

at least one hardware processor; and at least one non-transitory memory storing instructions, which, when executed by the at least one hardware processor, cause the system to:

poll a collection of distributed Network Repository Functions (NRFs) of the telecommunications network for status data of a collection of Network Functions (NFs) for each NRF of the distributed NRFs, wherein to poll the distributed NRFs requires authorizations to access a particular collection of NFs of a particular NRF, wherein each NRF monitors a service of associated NFs, and wherein each NRF stores a profile for each associated NF including a collection of fields that include a time-series collection of states;

receive particular status data obtained from at least a subset of fields of the collection of NFs of the distributed NRFs, wherein the particular status data is of a current time slice from the time-series collection of states;

generate an end-to-end network topology for the telecommunications network based on an aggregation of the particular status data,
   wherein the end-to-end network topology delineates current and historical states of services and connections of the telecommunications network; and
detect an anomalous service area based on a particular instance of the end-to-end network topology using a model configured to:
   receive, as input features, the particular status data of the end-to-end network topology for the current time slice, including one or more of: an integer, a float, a string, a Boolean, and/or a custom data class,
   compare the particular status data of respective fields of each NF to past status data of corresponding fields, accessed from prior polling of time-series collections of associated NF profiles,
      wherein the past status data comprises one or more statistical distributions based on historical states, and
   output, responsive to the input features and comparisons to the one or more statistical distributions, at least one flag indicating the anomalous service area.

2. The system of claim 1, wherein to poll the collection of distributed NRFs comprises causing the system to:
query the collection of NFs for each NRF,
   wherein each NRF includes a list of devices,
   wherein each query includes a list of commands to be run in a sequence on a respective device from the list of devices, and
   wherein each query includes an authorization that is specific to the respective device.

3. The system of claim 1, further caused to:
perform an action in response to the detected anomalous service area,
   wherein the action includes any one of:
      issuing an alert,
      recording a timestamp, or
      flagging an anomalous state, an anomalous field, an anomalous NF, or an anomalous NRF from within a particular service area of the telecommunications network.

4. The system of claim 1:
wherein the collection of NRFs is divided into regions, and
wherein each region corresponds to a geographical area.

5. The system of claim 1, wherein the end-to-end network topology reflects a portion of an entirety of the telecommunications network.

6. The system of claim 1, wherein to poll the collection of distributed NRFs is in response to an operation of:
a time function,
a clustering algorithm, or
a neural network.

7. The system of claim 1, wherein the particular status data comprises a combination of values for:
a fully qualified domain name (fqdn);
an IP address;
a network function status (nfstatus);
network slice selection assistance information (nssai);
a data network name (dnn);
locality;
priority; or
a Tracking Area Identity Range List (taiRangeList).

8. The system of claim 1,
wherein the particular status data comprises any of:
   an undiscoverable state,
   a suspended state, or
   a missing state, and
wherein the past status data comprises any one of:
   a registered state, or
   a suspended state.

9. A non-transitory, computer-readable storage medium comprising instructions recorded thereon that, when executed by at least one processor of a system of a wireless 5G telecommunications network, cause the system to:
poll a collection of distributed Network Repository Functions (NRFs) of a telecommunications network for status data of a collection of Network Functions (NFs) for each NRF of the distributed NRFs,
   wherein each NRF monitors a service of associated NFs, and
   wherein each NRF stores a profile for each NF including a collection of fields that each include a time-series collection of states;
receive particular status data obtained from at least a subset of the fields of the collection of NFs of the distributed NRFs,
   wherein the particular status data is of a current time slice from the time-series collection of states;
generate an end-to-end network topology for the telecommunications network based on an aggregation of the particular status data,
   wherein the end-to-end network topology delineates states of services or connections of the telecommunications network; and
detect an anomalous service area based on a particular instance of the end-to-end network topology using a model configured to:
   receive, as input features, the particular status data of the end-to-end network topology for the current time slice, including one or more of: an integer, a float, a string, a Boolean, and/or a custom data class,
   compare the particular status data of respective fields of each NE to past status data of corresponding fields, accessed from prior polling of time-series collections of associated NE profiles,
      wherein the past status data comprises one or more statistical distributions based on historical states, and
   output, responsive to the input features and comparisons to the one or more statistical distributions, at least one flag indicating the anomalous service area.

10. The non-transitory, computer-readable storage medium of claim 9, wherein to poll the collection of distributed NRFs comprises causing the system to:
query the collection of NFs for each NRF,
   wherein each NRF includes a list of devices,
   wherein each query includes a list of commands to be run in a sequence on a respective device from the list of devices, and
   wherein each query includes an authorization that is specific to the respective device.

11. The non-transitory, computer-readable storage medium of claim 9, wherein the system is further caused to:
    perform an action in response to a detected anomaly,
        wherein the action includes any one of:
            issuing an alert,
            recording a timestamp, or
            flagging an anomalous state, an anomalous field, an anomalous NF, or an anomalous NRF from within a particular service area of the telecommunications network.

12. The non-transitory, computer-readable storage medium of claim 9:
    wherein the collection of NRFs is divided into regions, and
    wherein each region corresponds to a geographical area.

13. The non-transitory, computer-readable storage medium of claim 9, wherein to poll the collection of distributed NRFs is in response to an operation of:
    a time function,
    a clustering algorithm,
    a neural network, or
    a statistical distribution based on historical data.

14. The non-transitory, computer-readable storage medium of claim 9, wherein status data of each NRF comprises multiple values of:
    a fully qualified domain name (fqdn);
    an IP address;
    a network function status (nfstatus);
    network slice selection assistance information (nssai);
    a data network name (dnn);
    locality;
    priority; or
    a Tracking Area Identity Range List (taiRangeList).

15. The non-transitory, computer-readable storage medium of claim 9, wherein to detect the anomalous service area comprises causing the system to:
    wherein the current state comprises any one of:
        an undiscoverable state,
        a suspended state, or
        a missing state, and
    wherein the undiscoverable state comprises any of:
        a registered state, or
        a suspended state.

16. A method performed by a central hub of a telecommunications network, the method comprising:
    polling multiple Network Repository Functions (NRFs) of the telecommunications network for status data of associated Network Functions (NFs),
        wherein each NRF stores a profile for an NF including a collection of fields that each include a time-series collection of states;
    receiving particular status data of the time-series collection of states for fields of at least a subset of the NFs of the multiple NRFs at the central hub;
    generating an end-to-end network topology for the telecommunications network based on an aggregation of the particular status data,
        wherein the end-to-end network topology delineates states of services or connections of the telecommunications network; and detecting an anomalous service area based on a particular instance of the end-to-end network topology using a model configured to:
    receive, as input features, the particular status data of the end-to-end network topology for the current time slice, including one or more of: an integer a float, a string a Boolean, and/or a custom data class,
    compare the particular status data of respective fields of each NF to past status data of corresponding fields, accessed from prior polling of time-series collections of associated NE profiles,
        wherein the past status data comprises one or more statistical distributions based on historical states, and
    output responsive to the input features and comparisons to the one or more statistical distributions, at least one flag indicating the anomalous service area.

17. The method of claim 16, further comprising:
    performing an action in response to a detected anomaly,
        wherein the action includes any one of:
            issuing an alert,
            recording a timestamp, or
            flagging an anomalous state, an anomalous field, an anomalous NF, or an anomalous NRF.

18. The method of claim 16,
    wherein the current state comprises any one of:
        an undiscoverable state,
        a suspended state, or
        a missing state, and
    wherein the past state comprises any one of:
        a registered state, or
        a suspended state.

19. The method of claim 16, wherein polling the multiple NRFs comprises:
    querying the associated NFs for each NRF,
        wherein each NRF includes a list of devices,
        wherein each query includes a list of commands to be run in a sequence on a respective device from the list of devices, and
        wherein each query includes an authorization that is specific to the respective device.

20. The method of claim 19, further comprising:
    providing the authorization to the device;
    connecting to the device;
    running the commands in a proper sequence on the device;
    collecting standard output from the device;
    querying an NF API for additional information;
    mapping the additional information into the standard output;
    parsing the standard output for relevant information based on the mapping;
    sorting the relevant information into a readable format; and
    retrieving from the device the relevant information in the readable format as status data.

\* \* \* \* \*